United States Patent Office 3,072,667
Patented Jan. 8, 1963

3,072,667
ALKYLATED DERIVATIVES OF
4,4'-BIS(4-PIPERIDINOLS)
Robert I. Meltzer, Rockaway, and Wilson B. Lutz, Florham Park, N.J., assignors to Warner-Lambert Pharmaceutical Company, Morris Plains, N.J., a corporation of Delaware
No Drawing. Filed Sept. 25, 1961, Ser. No. 140,212
3 Claims. (Cl. 260—294.7)

The present invention relates to new and novel piperidine derivatives of the formula

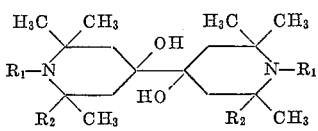

wherein $R_1$ is hydrogen or lower alkyl and $R_2$ is hydrogen or methyl and to the pharmaceutically acceptable non-toxic acid addition and quaternary ammonium salts thereof.

The compounds of our invention having the above formula have been found to possess significant pharmacological activity in lowering blood pressure. Moreover, they are valuable intermediates in the production of other piperidine derivatives.

We have now found that the compounds of our invention may be prepared by the treatment of substituted 4-piperidone starting materials of the formula

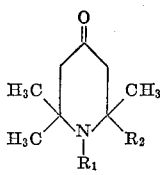

with amalgamated aluminum in benzene under reflux. The addition of aqueous alkali to the mixture at the conclusion of the reaction results in the formation of crystals of the product in the organic phase.

The compounds of our invention bearing lower alkyl $R_1$ substituents may also be prepared by the N-alkylation of the compounds bearing hydrogen substituents on each piperidine nitrogen atom.

The substituted 4-piperidone starting material are well known compounds which may be prepared by conventional procedures.

The compounds of our invention may be readily converted by conventional procedures into their pharmaceutically acceptable non-toxic acid addition and quaternary ammonium salts. Useful acid addition salts are those of such acids as maleic, oxalic, citric, acetic, methylsulfonic, p-toluenesulfonic, sulfonic, sulfuric, phosphoric, cinnamic, hydrochloric, hydrobromic and the like. Useful quaternaries are formed with such reactive halides or esters as methyl iodide, n-hexyl bromide, benzyl chloride, methyl sulfate, ethyl sulfate, methyl p-toluenesulfonate and the like.

For therapeutic use, our new and novel compounds, either as the free base or in the form of a salt, may be formulated with a conventional pharmaceutical carrier to form tablets, capsules, elixirs, solutions, suspensions, suppositories and the like.

The following examples are included in order further to illustrate our invention:

EXAMPLE 1

4,4'-Bis(2,2,6,6-Tetramethyl-4-Piperidinol)

In a 250 ml. flask fitted with 2 x 24 cm. column packed with glass helices and mechanical stirrer are placed 27.6 g. (0.178 moles) of crude anhydrous 2,2,6,6-tetramethyl-4-piperidone and 100 ml. of benzene. About 70 ml. of benzene are distilled in order to dry the reaction mixture. Mercuric chloride, 1.5 g., is then added followed by 3.3 g. of freshly scratched aluminum foil. After one hour of stirring at reflux temperature, no apparent reaction has taken place. Some strips of aluminum foil pre-amalgamated in alcoholic mercuric chloride are then added followed by some small crystals of iodine. After several minutes the mixture appears to thicken and after three hours becomes greenish-gray, most of the aluminum appearing to have reacted. 50 ml. of 10 M potassium hydroxide are added, thus forming two liquid phases. The lower layer is discarded and the upper layer, which contains white crystalline material, is filtered. The solid thus obtained melts at 169–174° and, unlike 2,2,6,6-tetramethyl-4-piperidinol, is insoluble in ethyl acetate. It is dissolved in dil. acetic acid, filtered, and precipitated with aqueous potassium hydroxide. The product, collected and washed with cold aqueous ammonia, weighs 5.57 g. M.P. 176–180°.

Recrystallization from toluene gives 3.58 g. of small crystals, M.P. 176–179°. Working up the filtrates gives additional material which after recrystallization from Skellysolve C melts at 177–179° and weighs 2.7 g. The yield of 4,4'-bis(2,2,6,6-tetramethyl-4-piperidinol) is 22.7%.

EXAMPLE 2

4,4'-Bis(1,2,2,6,6-Pentamethyl-4-Piperidinol)

A mixture of 1.0 g. (0.0032 mole) of 4,4'-bis(2,2,6,6-tetramethyl-4-piperidinol), 2 ml. of 37 percent formalin and sufficient formic acid to make the mixture slightly acid are heated together in a test tube for about nine hours on a steam bath. Formic acid is added periodically to keep the mixture nearly neutral. The reaction mixture is then made strongly basic with 10 M potassium hydroxide, the product separating as white crystals. The semi-solid mass is dispersed in about 80 ml. of water, filtered, and washed with water. When dry it weighs 0.8 g. (74%), M.P. 140–149°. This is dissolved in 10 ml. of methanol, filtered, and the filtrate diluted with about 15 ml. of water. The crystals which separate weigh 0.7 g. (64.5%) M.P. 146–148°.

Some of this material is sublimed for analysis at 005 mm., bath temperature 110–150°. The product melts at 149–150°.

ANALYSIS

|        | C     | H     | N    |
|--------|-------|-------|------|
| Calc.  | 70.54 | 11.84 | 8.23 |
| Found  | 70.44 | 11.80 | 8.21 |

In the foregoing examples, all temperatures are given in degrees centigrade.

It is understood that the foregoing detailed description is given merely by way of illustration and that many variations may be made therein without departing from the spirit of our invention.

Having described our invention what we desire to secure by Letters Patent is:

1. A member selected from the group consisting of compounds of the formula

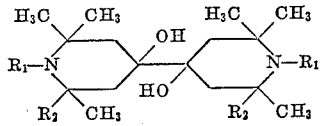

wherein $R_1$ is a member selected from the group consisting of hydrogen and lower alkyl and $R_2$ is a member selected from the group consisting of hydrogen and methyl, and the pharmaceutically acceptable non-toxic acid addition salts thereof.

2. 4,4'-bis(2,2,6,6-tetramethyl-4-piperidinol).
3. 4,4'-bis(1,2,2,6,6-pentamethyl-4-piperidinol).

No references cited.